(12) United States Patent
Hauck et al.

(10) Patent No.: US 9,062,723 B2
(45) Date of Patent: Jun. 23, 2015

(54) PARALLEL DOUBLE CLUTCH DEVICE AND DRIVETRAIN HAVING A PARALLEL DOUBLE CLUTCH DEVICE OF SAID TYPE

(75) Inventors: Hans Juergen Hauck, Schwaebisch Hall (DE); Christian Pilz, Oftersheim (DE); Jens Henze, Ahnatal (DE); Goetz Nicklas, Roemerberg (DE); Rainer Gerathewohl, Karlsruhe (DE)

(73) Assignee: BORGWARNER INC., Auburn Hills, MI (US)

( * ) Notice: Subject to any disclaimer, the term of this patent is extended or adjusted under 35 U.S.C. 154(b) by 426 days.

(21) Appl. No.: 13/389,116

(22) PCT Filed: Aug. 2, 2010

(86) PCT No.: PCT/US2010/044087
§ 371 (c)(1),
(2), (4) Date: Feb. 6, 2012

(87) PCT Pub. No.: WO2011/019532
PCT Pub. Date: Feb. 17, 2011

(65) Prior Publication Data
US 2012/0132498 A1    May 31, 2012

(30) Foreign Application Priority Data

Aug. 14, 2009  (DE) .......................... 10 2009 037 303
Mar. 10, 2010  (DE) .......................... 10 2010 010 922

(51) Int. Cl.
*F16D 25/08* (2006.01)
*F16D 25/10* (2006.01)
*F16D 21/06* (2006.01)

(52) U.S. Cl.
CPC .............. *F16D 25/082* (2013.01); *F16D 21/06* (2013.01); *F16D 25/10* (2013.01); *F16D 2021/0661* (2013.01); *Y02T 10/76* (2013.01)

(58) Field of Classification Search
CPC ...................... F16D 25/082; F16D 2021/0661
USPC ......................... 192/48.603, 48.606, 48.607
See application file for complete search history.

(56) References Cited

U.S. PATENT DOCUMENTS

| | | | |
|---|---|---|---|
| 2,636,585 A * | 4/1953 | Livermore ............... | 192/48.611 |
| 3,964,585 A | 6/1976 | Murayama et al. | |
| 4,632,234 A | 12/1986 | Bardoll et al. | |
| 8,327,991 B2 * | 12/2012 | Scholz et al. ............... | 192/85.5 |
| 2005/0082136 A1 | 4/2005 | Braford et al. | |
| 2007/0240961 A1 * | 10/2007 | Gremplini et al. ......... | 192/87.11 |

FOREIGN PATENT DOCUMENTS

| | | | | |
|---|---|---|---|---|
| DE | 102008055682 B2 * | 6/2010 | ............. | F16D 25/10 |
| WO | 2008131815 A1 | 11/2008 | | |

OTHER PUBLICATIONS

Mar. 14, 2011 International Search Report for PCT/US2010/044087.
* cited by examiner

*Primary Examiner* — Richard Lorence
(74) *Attorney, Agent, or Firm* — Howard & Howard Attorneys PLLC

(57) ABSTRACT

A parallel double-clutch device is arranged in a drivetrain of a motor vehicle between a drive unit and transmission of the drivetrain. The device comprises a first clutch arrangement assigned to a first transmission-input shaft for selectively transmitting torque between the drive unit and first transmission-input shaft. A second clutch arrangement is assigned to a second transmission-input shaft for selectively transmitting torque between the drive unit and second transmission-input shaft. The first clutch arrangement can be actuated by at least one hydraulically drivable first actuating piston assigned a first pressure chamber delimited by a first pressure-chamber housing and the first actuating piston. The second clutch arrangement can be actuated by at least one hydraulically drivable second actuating piston assigned a second pressure chamber delimited by a second pressure-chamber housing and the second actuating piston. The pressure-chamber housing is at least partially substantially stationary and/or rotationally fixed.

15 Claims, 4 Drawing Sheets

Figure 1:
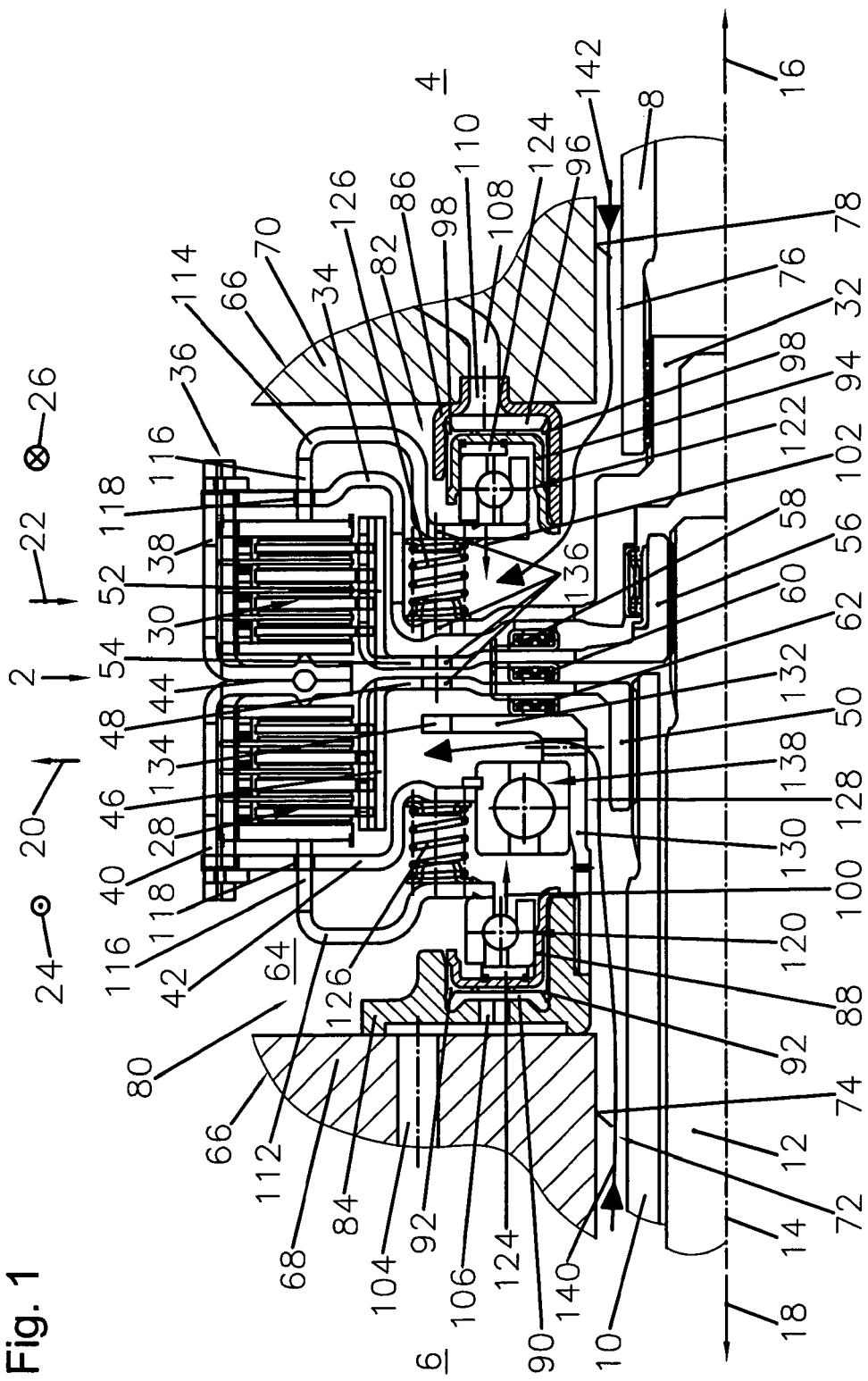

PARALLEL DOUBLE CLUTCH DEVICE AND DRIVETRAIN HAVING A PARALLEL DOUBLE CLUTCH DEVICE OF SAID TYPE

CROSS-REFERENCE TO RELATED APPLICATIONS

This application claims priority to and benefit of the filing date of International Patent Application PCT/US2010/044087 entitled "Parallel Double Clutch Device and Drivetrain Having a Parallel Double Clutch Device of Said Type" and filed on Aug. 2, 2010, which claims priority to and benefit of the filing date of German Patent Application 10 2009 037 303.9 filed on Aug. 14, 2009 and German Patent Application 10 2010 010 922.3 filed on Mar. 10, 2010.

BACKGROUND OF INVENTION

1. Field of Invention

The present invention relates to, in general, a parallel double clutch device for arranging in a drivetrain of a motor vehicle between a drive unit and a transmission and, in particular, a drivetrain having the parallel double clutch device.

2. Description of Related Art

U.S. Pat. No. 7,246,692 B2 describes a parallel double clutch device having a first clutch arrangement and having a second clutch arrangement which are arranged in an axially staggered fashion, with the first clutch arrangement serving for the selective transmission of torque between a drive unit and a first transmission input shaft, while the second clutch arrangement serves for the selective transmission of torque between the drive unit and a second transmission input shaft. The two clutch arrangements can be actuated in each case by a hydraulically drivable actuating piston. For this purpose, each of the two actuating pistons is assigned a pressure chamber which is delimited by a pressure chamber housing and the respective actuating piston. The pressure chamber housing is formed in each case by a section of an inner rotating input hub of the parallel double clutch device. Furthermore, a compensating chamber for centrifugal oil compensation is provided on that side of each actuating piston which faces away from the pressure chamber. The abovementioned input hub of the parallel double clutch device is of substantially tubular design, with the tubular input hub being supported in the radial direction on a stationary support tube. To act on the pressure chambers with pressurized oil and thereby be able to drive the actuating piston, rotary leadthroughs are provided between the clutch input hub and the support tube, which rotary leadthroughs are separated from one another by corresponding rotary leadthrough seals.

The known parallel double clutch device has proven itself but is afflicted with some disadvantages. Firstly, the hydraulic system for driving the actuating piston is subject to leaks, such that the use of a high-pressure accumulator for increasing the efficiency of the parallel double clutch arrangement is duly possible but leads to increased leakage losses. Secondly, the known parallel double clutch device has a complex design which takes up a large amount of installation space.

It is therefore an object of the present invention to provide a parallel double clutch arrangement which firstly ensures substantially leak-free operation even at high pressure of the hydraulic medium and if appropriate with the use of a high-pressure accumulator, and which secondly has a simple and installation-space-saving design. The present invention is also based on the object of providing a drivetrain having a parallel double clutch device with such advantages.

SUMMARY AND ADVANTAGES OF INVENTION

The present invention overcomes the disadvantages in the related art in a parallel double-clutch device for arranging in a drivetrain of a motor vehicle between a drive unit and transmission of the drivetrain. The parallel double-clutch device comprises a first clutch arrangement assigned to a first transmission-input shaft for selectively transmitting torque between the drive unit and first transmission-input shaft. A second clutch arrangement is assigned to a second transmission-input shaft for selectively transmitting torque between the drive unit and second transmission-input shaft. The first clutch arrangement can be actuated by at least one hydraulically drivable first actuating piston that is assigned a first pressure chamber delimited by a first pressure-chamber housing and the first actuating piston. The second clutch arrangement can be actuated by at least one hydraulically drivable second actuating piston that is assigned a second pressure chamber delimited by a second pressure-chamber housing and the second actuating piston. The pressure-chamber housing is at least partially substantially stationary and/or rotationally fixed. The present invention overcomes the disadvantages in the related art also in a drivetrain of a motor vehicle that has the parallel double-clutch device.

A pressure chamber housing which is formed so as to be at least partially, particularly entirely, stationary and/or rotationally fixed has firstly the advantage that no rotary leadthrough is required to be able to act on the pressure chambers with pressurized oil or some other hydraulic medium and thereby drive the actuating pistons. By dispensing with a rotary leadthrough with the associated rotary leadthrough seals, which can lead to high leakage losses, it is possible in the parallel double clutch device according to the invention to select a particularly high operating pressure of the pressurized oil or hydraulic medium, with substantially leakage-free operation being ensured. In particular, the use of a high-pressure accumulator in the pressurized oil supply path is possible without substantially leakage-free operation of the parallel double clutch device being jeopardized. In this way, an increase in efficiency of the overall system is ultimately obtained. Furthermore, the design of the parallel double clutch device is simplified significantly, which can likewise lead to a reduction in the required installation space. Said simplification of the design can be attributed firstly to the omission of the rotary leadthroughs with the associated rotary leadthrough seals. Secondly, the simplified design is obtained in that, as a result of the pressure chamber which is formed so as to be at least partially, particularly entirely, stationary and/or rotationally fixed, no compensating chamber for centrifugal oil compensation is required. It is possible in particular to dispense with additional measures or components for generating said compensating chambers for centrifugal oil compensation.

Taking the above-stated advantages of the parallel double clutch device according to the invention as a starting point, the parallel double clutch device according to the invention, in a particular embodiment thereof, has no compensating chambers for centrifugal oil compensation assigned to the actuating piston.

In a further particular embodiment of the parallel double clutch device according to the invention, the parallel double clutch device has no rotary leadthrough in the pressurized oil supply path for the pressure chambers assigned to the actuating piston, in order to permit substantially leakage-free operation at a particularly high pressure of the pressurized oil or hydraulic medium and if appropriate to permit the use of a high-pressure accumulator within the pressurized oil supply path.

According to a further particular embodiment of the parallel double clutch device according to the invention, a high-pressure accumulator is provided within the pressurized oil supply paths for the pressure chambers in order to increase the efficiency of the overall system.

In a particular embodiment of the parallel double clutch device according to the invention, the actuating piston, the associated pressure chambers and the associated pressure chamber housing are arranged on the slave side of the hydraulic system. The pressure chamber housing which delimits the pressure chamber may therefore also be referred to as a slave cylinder.

In the parallel double clutch device according to the invention, the two clutch arrangements may be assigned in each case a plurality of separate actuating pistons. However, in an embodiment of the parallel double clutch device according to the invention, in order to firstly simplify the production of the parallel double clutch device and secondly ensure a uniform transmission of the actuating force to the respective clutch arrangement, the actuating pistons are designed as annular pistons, such that merely an annular first actuating piston and an annular second actuating piston are required.

In a further embodiment of the parallel double clutch device according to the invention, at least one opening is provided for supplying pressurized oil or some other hydraulic medium into the pressure chamber of the pressure chamber housing. Here, said opening for supplying the pressurized oil is provided particularly in the stationary and/or rotationally fixed pressure chamber housing or in the stationary and/or rotationally fixed part of the pressure chamber housing, in order to be able to dispense with a rotary leadthrough which is subject to leakage, or the rotary leadthrough seals of which are subject to leakage.

In a further embodiment of the parallel double clutch arrangement according to the invention, to eliminate the need for arranging the respective actuating piston directly in the region of the associated clutch arrangement, and moreover to obtain a relatively free and installation-space-saving arrangement of the respective actuating piston, in each case one force-transmitting element is provided via which the respective clutch arrangement can be actuated by the associated actuating piston. In this way, the actuating piston may for example be arranged radially inside or outside the associated clutch arrangement in order, by corresponding nesting, to realize a shortening of the axial structural length of the parallel double clutch device.

In a further embodiment of the parallel double clutch device according to the invention, the actuating piston is decoupled in terms of rotational drive from the abovementioned force-transmitting element. In this way, any rotation of the force-transmitting element is not transmitted to the actuating piston, such that the actuating piston does not rotate, or rotates only to an insignificant extent, relative to the at least partially stationary and/or rotationally fixed pressure chamber housing. This ensures two things. Firstly, on account of the actuating piston which is decoupled in terms of rotational drive, a centrifugal oil pressure—even if only a low centrifugal oil pressure—within the pressure chamber is avoided, such that even minor cumbersome measures for centrifugal oil compensation are eliminated. Secondly, merely simple sealing of the respective chamber is required using simple seals between the actuating piston on the one hand and the pressure chamber housing on the other hand, which seals are suitable for preventing leakage even at particularly high pressure of the pressurized oil or hydraulic medium.

To obtain particularly reliable decoupling in terms of rotational drive between the actuating piston and force-transmitting element in the above-described embodiment, the decoupling in terms of rotational drive between the actuating piston and the force-transmitting element takes place, in a further embodiment of the parallel double clutch device according to the invention, by an engagement bearing between the actuating piston and the force-transmitting element. By the engagement bearing and the inner rollers thereof, friction between the rotating force-transmitting element and the actuating piston which is decoupled in terms of rotational drive is substantially eliminated, such that a transmission of the rotational movement of the force-transmitting element to the actuating piston is substantially eliminated. In said embodiment, an exchangeable spacer is particularly provided between the actuating piston and the engagement bearing in the actuating direction of the actuating piston, such that the spacing between the actuating piston and engagement bearing in the actuating direction can be adjusted in a more flexible manner, and tolerance compensation can be carried out.

Regardless of whether or not the actuating piston and the force-transmitting element are decoupled in terms of rotational drive, in a further particular embodiment of the parallel double clutch device according to the invention, the actuating piston is rotationally fixedly connected to the pressure chamber housing. In this way, all the walls of the respective pressure chamber are of rotationally fixed design, such that not even the slightest centrifugal oil pressure can be generated within the pressure chamber, and countermeasures for centrifugal oil compensation can be dispensed with entirely. Furthermore, as a result of the actuating piston which is rotationally fixedly connected to the pressure chamber housing, it is possible to obtain simple sealing of the pressure chamber by a seal between the actuating piston on the one hand and the pressure chamber housing on the other hand, which seal ensures leakage-free operation event at a particularly high pressure of the pressurized oil or hydraulic medium. In said embodiment, the rotationally fixed connection of the actuating piston to the pressure chamber housing takes place particularly in a positively locking fashion. For example, in order to realize the rotationally fixed connection, it is possible for example for a projecting extension or a depression to be provided on the actuating piston, wherein the projecting extension can engage into a depression on the pressure chamber housing, or for a projecting extension on the pressure chamber housing to engage into the depression on the actuating piston.

The abovementioned force-transmitting element could basically be formed in the manner of a lever in order to boost the actuating force of the actuating piston by a lever ratio, such that the force ultimately acting on the clutch arrangement is increased. Alternatively, or in addition, the force-transmitting element could also be of elastic design, such that that it can furthermore exert a restoring force on the actuating piston. To realize said two features, the force-transmitting element could be formed for example by a plate spring. In a further particular embodiment of the parallel double clutch device according to the invention, however, the force-transmitting element is designed such that the actuating force of the actuating piston can be transmitted in a ratio of 1:1 to the clutch arrangement. An increase of the force acting on the respective clutch arrangement by a lever ratio between the actuating piston and the clutch arrangement is not required in this embodiment, especially because, for the reasons stated above, the parallel double clutch arrangement already permits a particularly high pressure of the pressurized oil or hydraulic medium. In this embodiment, said transmission of the actuating force of the actuating piston in the ratio of 1:1 to the clutch arrangement could basically be obtained by a lever-like force-transmitting element, but, in this embodiment, the actuating force is particularly transmitted to the clutch arrangement without a lever ratio, that is to say the force-transmitting element is particularly not formed in the manner of a lever. This firstly has the advantage that the force-transmitting element is of less complex design and is therefore less susceptible to faults, while secondly it is possible to obtain a smaller structural length in the direction of the actuating force—generally in the axial direction. In said embodiment, the force-transmitting element is particularly formed in one piece and/or interacts directly with the engagement bearing and/or the clutch arrangement, in order to obtain a particularly simple design of the parallel double clutch device. In this embodiment, the single-piece force-transmitting element is particularly of substantially non-elastic design, while the restoring force for restoring the actuating piston is imparted by a separate restoring spring. In said design variant, the force-transmitting element should be designed to be at least less elastic than the associated restoring spring.

In a further embodiment of the parallel double clutch device according to the invention, a stationary and/or rotationally fixed clutch housing is provided in which the double clutch device is arranged. Here, the clutch housing may be formed for example by a part of the transmission housing and/or a part of the engine housing.

In a further particular embodiment of the parallel double clutch device according to the invention, to provide an at least partially, particularly entirely, stationary and/or rotationally fixed pressure chamber housing for the respective actuating piston, the pressure chamber housing is attached to or formed in one piece with the clutch housing in a particularly stationary and/or rotationally fixed manner.

Two alternatives for the arrangement of the pressure chamber housing on the clutch housing are described here. In the former alternative, the pressure chamber housing is attached to the clutch housing in a stationary and/or rotationally fixed manner. With the first alternative, the pressure chamber housing and the clutch housing can firstly be produced and machined separately, before the pressure chamber housing is then subsequently fastened to the clutch housing in a stationary and/or rotationally fixed manner. Particularly precise and uniform simple production of the pressure chamber housing with the associated pressure chamber is made possible in this way, which cannot be achieved to the same extent if the pressure chamber housing is formed in one piece with the clutch housing. Furthermore, with the former alternative, the pressure chamber housing is particularly attached to the clutch housing in a detachable or exchangeable fashion, especially because in this way firstly a fast adaptation of the pressure chamber housing to the respective parallel double clutch device is possible during the course of production, and secondly a fast repair of the parallel clutch device is possible if required.

In a further embodiment of the parallel double clutch device according to the invention, at least one pressurized oil duct for supplying pressurized oil or hydraulic medium into at least one of the pressure chambers runs within the wall of the clutch housing. Here, said pressurized oil duct particularly opens into the abovementioned opening for supplying pressurized oil into the pressure chamber of the pressure chamber housing. Although the pressurized oil ducts could basically also be formed in separate lines, pressurized oil ducts running within the wall of the clutch housing have however proven to be advantageous with regard to the utilization of installation space.

In a further embodiment of the parallel double clutch device according to the invention, the abovementioned clutch housing has a first housing section and a second housing section which is situated opposite in the axial direction. The first housing section is particularly a housing or transmission housing bell with a housing opening, while the second housing section is particularly formed by a housing cover for closing off the housing opening. Here, the second housing section in the form of the housing cover is particularly attached in a detachable fashion to the first housing section in the form of the housing or transmission housing bell, in order to enable fast access to the parallel double clutch device in the event of repairs or servicing.

The first and second pressure chamber housings could basically be provided either on the first housing section or on the second housing section. However, in a further embodiment of the parallel double clutch device according to the invention, to enable the respective actuating piston to be arranged as close as possible to the associated clutch arrangement, and to be able to dispense with a cumbersome force-transmitting element, one pressure chamber housing is provided on the first housing section while the other pressure chamber housing is provided on the second housing section. Since the two clutch arrangements are arranged in an axially staggered configuration in a parallel double clutch device, only a structurally short or small force-transmitting element is required in this embodiment, which force-transmitting element not only takes up less installation space but rather is also less susceptible to faults. In this embodiment, the abovementioned at least one pressurized oil duct for supplying pressurized oil into the associated pressure chamber is particularly provided both within the wall of the first housing section and also in the wall of the second housing section.

In a further embodiment of the parallel double clutch device according to the invention, the first clutch arrangement is assigned a cooling oil supply path while the second clutch arrangement is assigned a further cooling oil supply path, with the two cooling oil supply paths being formed at least initially separately from one another.

In a further embodiment of the parallel double clutch device according to the invention, one of the abovementioned cooling oil supply paths runs through a shaft passage opening in the first housing section. Here, said cooling oil supply path runs particularly between the edge of the shaft passage opening and one of the transmission input shafts, with said transmission input shaft particularly being formed by the outer transmission input shaft if the two transmission input shafts are in a radially nested arrangement. In addition, or alternatively, the other cooling oil supply path runs either through a shaft passage opening in the second housing section, particularly between the edge of the shaft passage opening and an input shaft of the double clutch device, or within one of the transmission input shafts, particularly the inner transmission input shaft if the transmission input shafts are in a radially nested arrangement. Here, a shaft passage opening is to be understood to mean that opening in the respective housing section through which the rotationally driving coupling between the parallel double clutch device on the one hand and the transmission and/or drive unit on the other hand takes place. In any case, in said embodiment, a cooling oil supply for the clutch arrangement is obtained which is particularly easy to realize, wherein it is again possible to dispense with a complex rotary leadthrough with corresponding rotary leadthrough seals, such that the design of the parallel double clutch device is simplified.

In a further embodiment of the parallel double clutch device according to the invention, to ensure a more direct or targeted cooling oil supply to the clutch arrangements if appropriate, at least one of the cooling oil supply paths alternatively or additionally runs through a cooling oil duct within the wall of the clutch housing, that is to say for example within the wall of the first housing section and/or of the second housing section, with the cooling oil not being formed by a shaft passage opening in the clutch housing. The cooling oil duct within the wall of the clutch housing may thereby, in order to ensure a more direct cooling oil supply, be extended for example closer to the respective clutch arrangement than would be the case with the shaft passage opening. It is however likewise possible for the cooling oil duct to open into the shaft passage opening, such that the corresponding cooling oil supply path runs both through the cooling oil duct within the wall and also through the shaft passage opening. In both cases, a more targeted cooling oil supply is possible, although the former exemplary embodiment is possible, especially because a more direct cooling oil supply is possible in this way.

On the basis of the above-described embodiment, in a further particular embodiment of the parallel double clutch device according to the invention, one cooling oil path runs through a cooling oil duct within the first housing section while the other cooling oil supply path runs through a cooling oil duct within the second housing section. In this way, an equally targeted and direct cooling oil supply to both of the clutch arrangements facing toward the respective housing sections is possible.

In a further particular embodiment of the parallel double clutch device according to the invention, to obtain a relatively short axial structural length despite the axial staggering of the clutch arrangements within the parallel double clutch device, the actuating piston and/or the associated engagement bearing is arranged radially inside or outside the associated clutch arrangement. Here, in order to further enhance the advantages specified in the introduction, the actuating piston and/or the associated engagement bearing is particularly arranged in a nested fashion in the radial direction with the associated clutch arrangement.

According to a further embodiment of the parallel double clutch device according to the invention, at least one of the actuating pistons is assigned at least one restoring spring for restoring the actuating piston, with the restoring spring being arranged radially inside or outside the associated clutch arrangement in order to permit a reduction in the axial structural length of the parallel double clutch device. Here, too, the at least one restoring spring is particularly arranged in a nested fashion in the radial direction with the associated clutch arrangement in order to obtain a particularly short axial structural length. In said embodiment, the restoring spring is particularly formed separately from the abovementioned force-transmitting element, and therefore not to serve for transmitting the actuating force of the actuating piston to the associated clutch arrangement.

According to a further embodiment of the parallel double clutch device according to the invention, the parallel double clutch device is of symmetrical design. The two clutch arrangements of the parallel double clutch device are therefore particularly formed symmetrically with respect to one another in relation to a plane spanned by the radial directions.

The double clutch device, particularly the input side thereof, may basically be supported indirectly or directly on one of the transmission input shafts in the axial and/or radial direction. However, in a further particular embodiment of the parallel double clutch device according to the invention, in order to obtain an arrangement of the double clutch device which is particularly resistant to tilting, the parallel double clutch device, particularly the input side thereof, is supported in the axial and/or radial direction on the clutch housing, particularly on a stationary support tube of the clutch housing. Here, the support tube is particularly connected in a stationary fashion to that housing section of the clutch housing which is arranged on the transmission side, with it being possible for the transmission input shafts to be arranged in a radially nested fashion in relation to the stationary support tube, that is to say the transmission input shafts would then run through the stationary support tube.

In a further particular embodiment of the parallel double clutch device according to the invention, which constitutes a refinement of the embodiment described above, the support of the double clutch device, particularly the input side thereof, in the axial and/or radial direction on the clutch housing or on the stationary support tube takes place via a rolling bearing, which is particularly a ball bearing. In this embodiment, the rolling bearing is particularly arranged in such a way as to support the parallel double clutch device, particularly the input side thereof, in both axial directions and in the radial direction on the clutch housing and on the stationary support tube.

In a further particular embodiment of the parallel double clutch device according to the invention, the two actuating pistons have mutually opposite actuating directions. Here, the actuating directions are to be understood to mean the directions in which the actuating pistons are displaced or exert their actuating force in order to actuate the respective clutch arrangement, with the mutually opposite actuating directions particularly being the mutually opposite axial directions of the parallel double clutch device. In this embodiment, it is also particularly possible for the actuating forces in both actuating directions to be supported on the clutch housing, particularly via the abovementioned rolling bearing. Here, the support of the actuating forces in both actuating directions via the rolling bearing has the advantage that any needle-roller bearings which may be provided for supporting provided plate carriers are relieved of load in the axial direction relative to one another, as a result of which the losses are reduced in relation to a configuration with support via said needle-roller bearings. In this embodiment, said needle-roller bearings particularly have play such that the actuating forces in both actuating directions are supported exclusively via the rolling bearings, in order to further enhance the stated advantage.

The abovementioned support tube on which the parallel double clutch device, particularly the input side thereof, can be supported in the axial and/or radial direction could basically be provided directly on the clutch housing or on one of the stated housing sections of the clutch housing. In a further embodiment of the parallel double clutch device according to the invention, the support tube is however attached to one of the pressure chamber housings or is formed by a section of the pressure chamber housing. Since the support tube is therefore arranged directly on the clutch housing via the pressure chamber housing, a particularly compact and lightweight design of the parallel double clutch device is obtained. In the former alternative, in which the support tube is attached to one of the pressure chamber housings, the support tube can initially be produced separately from the pressure chamber housing, before the support tube is subsequently attached to the pressure chamber housing. Said first alternative is thus different than the second alternative, in which the support tube is formed by a section of the pressure chamber housing and is therefore formed in one piece with the latter, especially since a modular design of the parallel double clutch device is possible in this way, while the support tube may be assigned together with other components of the double clutch device to another module, as will be described further below with reference to another embodiment of the double clutch device. At any rate, the assembly of the parallel double clutch device is simplified in this way.

In a further embodiment of the parallel double clutch device according to the invention, to be able to obtain a particularly expedient modular design of the parallel double clutch device which greatly simplifies the assembly of the parallel double clutch device, the support tube, alternatively or additionally to the embodiment described above, is releasably attached to the clutch housing or the pressure chamber housing. Here, to simplify the assembly of the support tube on the clutch housing or the pressure chamber housing, the support tube is particularly screwed onto the clutch housing or the pressure chamber housing. In this connection, it has proven to be particularly advantageous for the support tube to have an external or internal thread, by which the support tube can be screwed together with the clutch housing or the pressure chamber housing, which has a corresponding internal or external thread.

According to a further particular embodiment of the parallel double clutch device according to the invention, the parallel double clutch device, particularly the input side thereof, is in rotationally driving connection with a pump drive member of an oil pump. Here, the oil pump, which is particularly provided at the transmission side, may for example serve to feed the cooling oil which is conducted via the cooling oil supply paths to the clutch arrangements. In said embodiment, the pump drive is particularly a fraction mechanism drive, such that the pump drive member is designed as a traction mechanism gear wheel. The traction mechanism gear wheel may thus for example be a toothed wheel whose teeth engage into the chain of the pump drive which is formed as a chain gear.

To make it possible, in the above-described embodiment too, to obtain a modular design of the parallel double clutch device which simplifies the assembly and disassembly thereof, the parallel double clutch device, particularly the input side thereof, is releasably connected to the pump drive member. In this embodiment, the releasable connection between the double clutch device or the input side thereof on the one hand and the pump drive member on the other hand is particularly realized by a plug-in connection, particularly a spine toothing. In such a situation, the two modules, one of which has the pump drive member while the other has the double clutch device or the input side thereof, would merely have to be joined together in the axial direction in order to obtain the rotationally driving connection between the parallel double clutch device and the pump drive member, such that the assembly and disassembly of the modular double clutch device is sustainably simplified.

As already indicated above, the parallel double clutch device may be of suitably modular design in order to simplify the assembly and disassembly thereof, thereby reducing production and repair expenditure. Therefore, in a particular embodiment of the parallel double clutch device according to the invention, the parallel double clutch device is composed of three modules, specifically a first module, a second module and a third module, with it being possible for the three modules, in each case as a unit, to be assembled in the stated sequence and/or detached from one another in the reverse sequence. Here, the first module has the first housing section, the associated pressure chamber housing, the associated actuating piston, the associated engagement bearing and particularly the pump drive member. In contrast, the second module has the two clutch arrangements and particularly the support tube and/or the force-transmitting elements. In contrast, the third module has the second housing section, the associated pressure chamber housing, the associated actuating piston and the associated engagement bearing. Alternatively, the force-transmitting elements could also be assigned to the first and third modules, but if restoring springs are used, it has proven to be expedient for the force-transmitting elements to be assigned to the second module.

The drivetrain according to the invention has a drive unit, particularly an internal combustion engine, a transmission, particularly a double clutch transmission with two transmission input shafts, and a parallel double clutch device of the above-described type according to the invention arranged between the drive unit and the transmission.

In a particular embodiment of the drivetrain according to the invention, the transmission has an outer transmission input shaft formed as a hollow shaft and an inner transmission input shaft being provided, which outer transmission input shaft and inner transmission input are arranged in a radially nested fashion. In this way, one clutch arrangement is assigned to the outer transmission input shaft while the other clutch arrangement of the parallel double clutch device is assigned to the inner transmission input shaft.

Other advantages (and objects and features) of the present invention will be readily appreciated as the same becomes better understood while reading the subsequent detailed description of embodiments of the present invention taken in conjunction with figures of the accompanying drawing thereof.

BRIEF DESCRIPTION OF EACH FIGURE OF DRAWING

Figure 2:
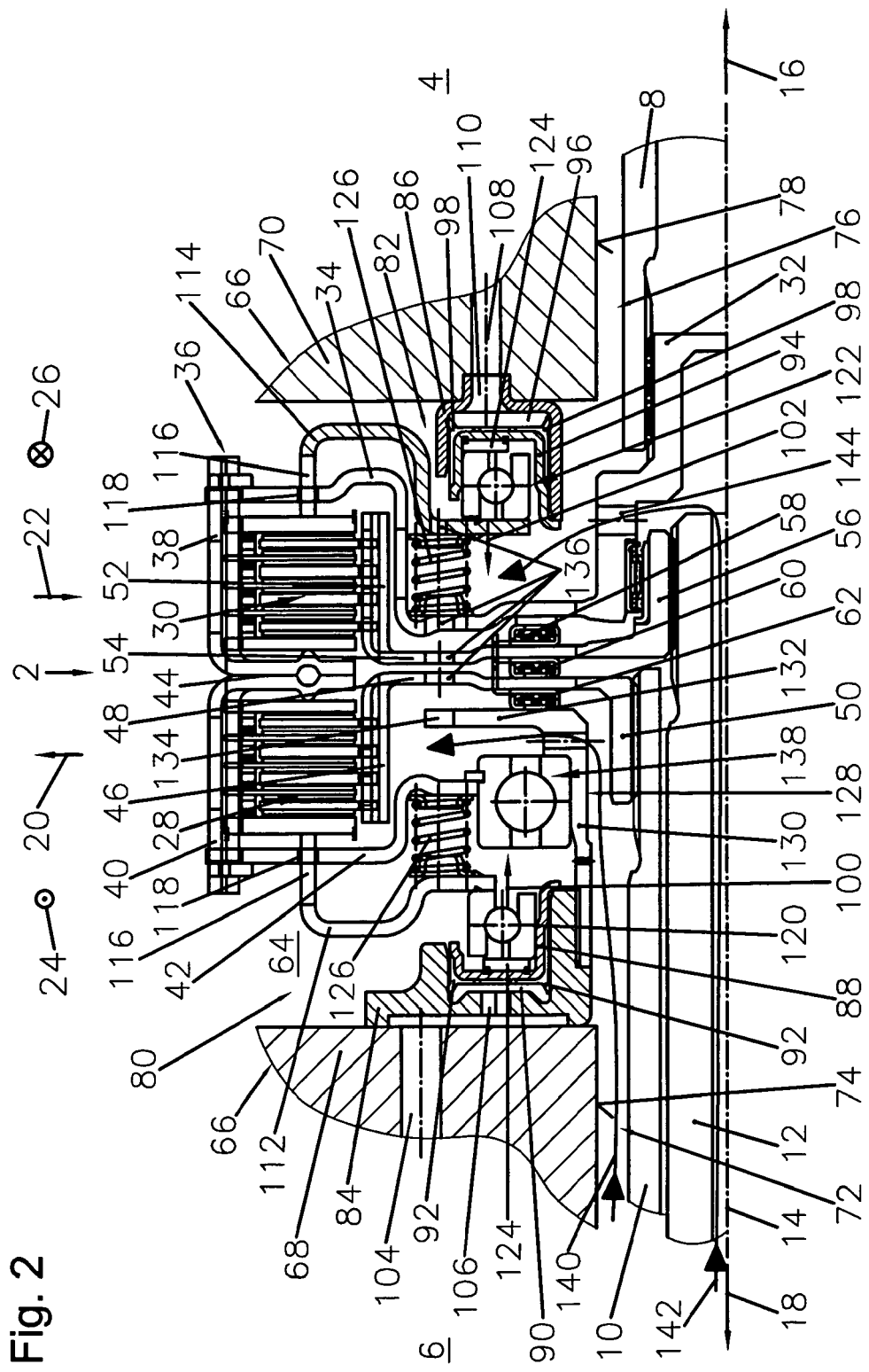
Figure 3:
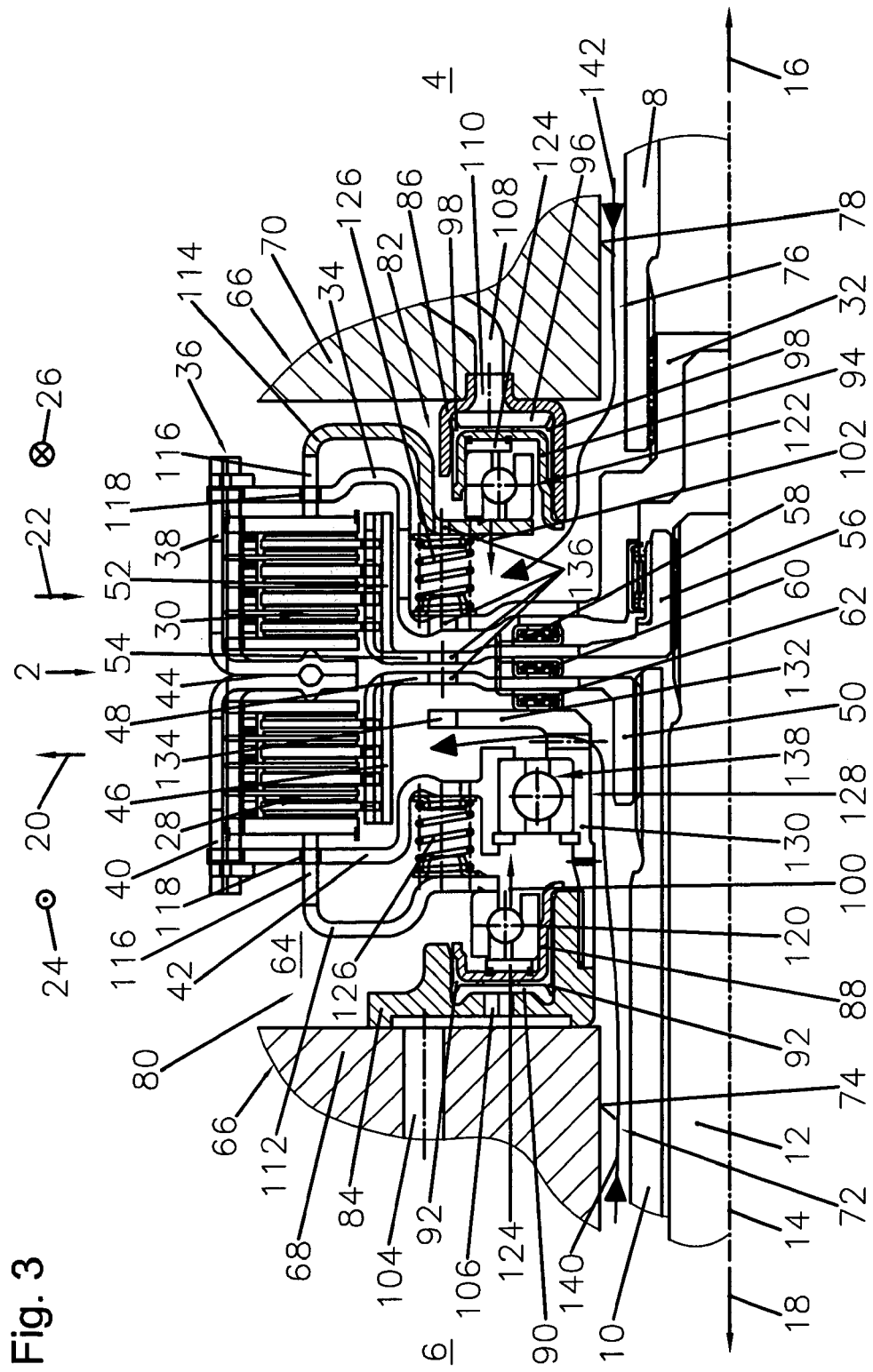
Figure 4:
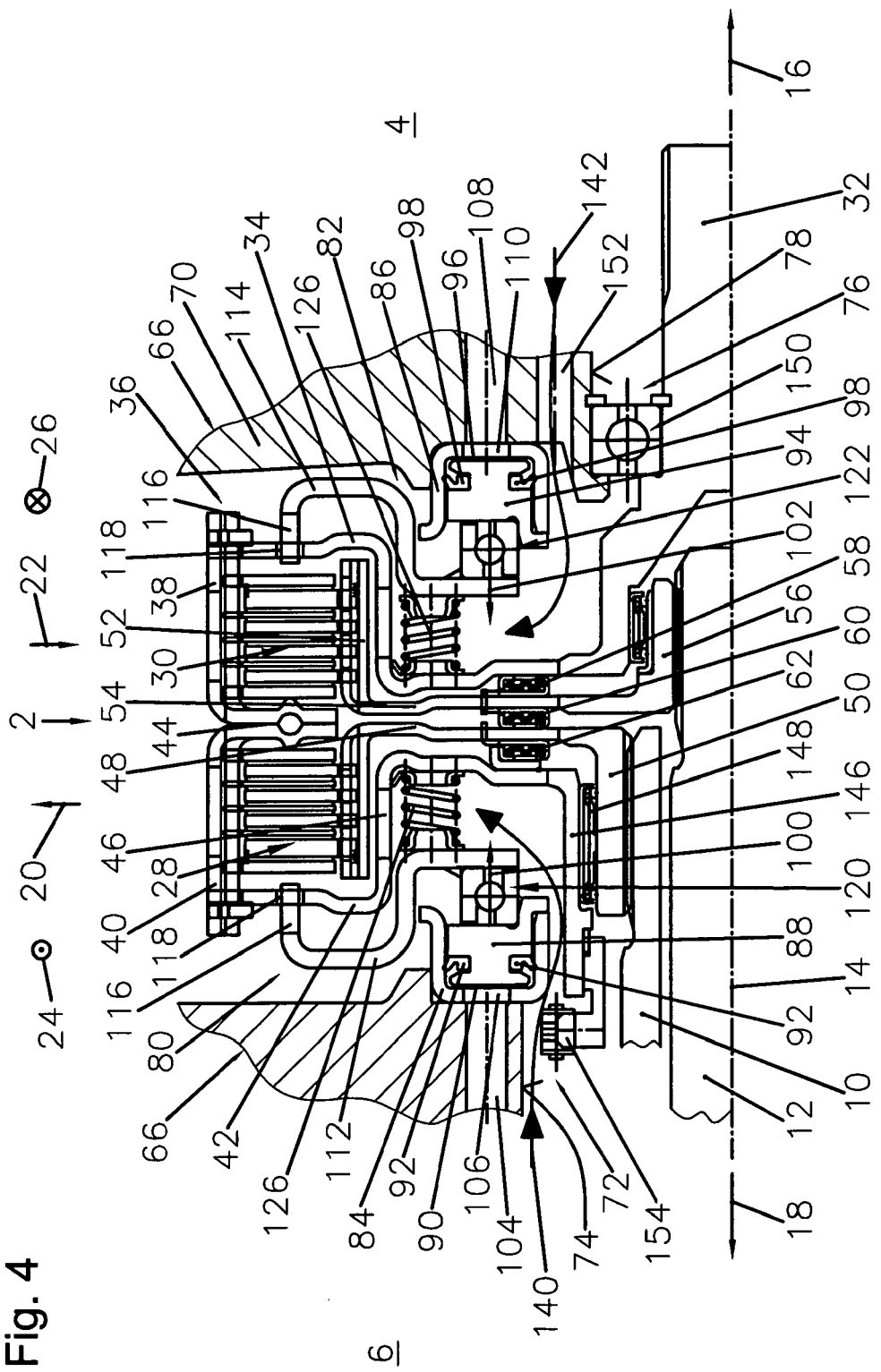

FIG. 1 shows a side view of a first embodiment of the parallel double clutch device according to the invention in a drivetrain of a motor vehicle in a sectional illustration, FIG. 2 shows a side view of a second embodiment of the parallel double clutch device according to the invention in a drivetrain of a motor vehicle in a sectional illustration, FIG. 3 shows a side view of a third embodiment of the parallel double clutch device according to the invention in a drivetrain of a motor vehicle in a sectional illustration, and FIG. 4 shows a side view of a fourth embodiment of the parallel double clutch device according to the invention in a drivetrain of a motor vehicle in a sectional illustration.

DETAILED DESCRIPTION OF EMBODIMENTS OF INVENTION

FIG. 1 shows a first embodiment of the parallel double clutch device 2 within a drivetrain of a motor vehicle between a drive unit 4 and a transmission 6, wherein of the drive unit 4, which is for example an internal combustion engine, only the output hub 8 is illustrated, and of the transmission 6, which is particularly a double clutch transmission, only a first transmission input shaft 10 and a second transmission input shaft 12 are illustrated. The parallel double clutch device 2 is rotatable about a rotational axis 14 which extends in the axial directions 16, 18, with FIG. 1 also showing the mutually opposite radial directions 20, 22 and the mutually opposite circumferential directions 24, 26 with the aid of corresponding arrows. The first transmission input shaft 10 is designed as a hollow shaft through which the second transmission input shaft 12 extends coaxially. The two transmission input shafts 10, 12 are therefore arranged in a nested fashion in the radial direction 20, 22, such that the first transmission input shaft 10 can be referred to as an outer transmission input shaft and the second transmission input shaft 12 can be referred to as an inner transmission input shaft.

The parallel double clutch device 2 has a first clutch arrangement 28 assigned to the first transmission input shaft 10 and a second clutch arrangement 30 assigned to the second transmission input shaft 12. Since the double clutch device 2 according to the invention is a parallel double clutch device 2, the two clutch arrangements 28, 30 are arranged in a staggered fashion, or parallel to one another, in the axial direction 16, 18. The two clutch arrangements 28, are wet-running multiplate clutch arrangements, such that the clutch arrangements 28, 30 are in each case composed substantially of a plate pack with inner and outer plates. The first clutch arrangement 28 thus serves for the selective transmission of torque between the drive unit 4 and the first transmission input shaft 10 of the transmission 6, while the second clutch arrangement 30 serves for the selective transmission of torque between the drive unit 4 and the second transmission input shaft 12 of the transmission 6.

The parallel double clutch device 2 also has a radially inner clutch input hub 32 which is in rotationally driving connection with the output hub 8 of the drive unit 4, with said rotationally driving connection particularly being of positively locking and releasable design. The clutch input hub 32 is also rotationally fixedly connected to a support section 34 which extends outward substantially in the radial direction 20. That end of the support section 34 which points outward in the radial direction 20 is rotationally fixedly connected to a substantially tubular outer plate carrier 36 which is divided in the axial direction 16, 18 into a second outer plate carrying section 38, which adjoins the first support section 34, and a first outer plate carrying section 40, which follows the second outer plate carrying section 38 in the axial direction 18. While the outer plates of the second clutch arrangement 30 are arranged in a rotationally fixed but axially movable manner on the second outer plate carrying section 38, the outer plates of the first clutch arrangement 28 are arranged in a rotationally fixed but axially movable manner on the first outer plate carrying section 40. The outer plate carrier 36 or first outer plate carrying section 40 is followed in the axial direction 18 by a second support section 42 which in turn extends inward in the radial direction 22 and is rotationally fixedly connected to the outer plate carrier 36 or first outer plate carrying section 40. The support of the second support section 42 in the radial and axial directions 20, 22; 16, 18 will be discussed in more detail further below.

As can be seen from FIG. 1, the axially staggered clutch arrangements 28, 30 are arranged in the axial direction 16, 18 between the first support section 34 and the second support section 42, with the clutch arrangements 28, 30 also being separated from one another in the axial direction 16, 18 by a substantially annular-disc-shaped partition section 44. Here, the partition section 44 is formed as part of the outer plate carrier 36, wherein the first clutch arrangement 28 can be supported on the partition section 44 in the axial direction 16 and the second clutch arrangement 30 can be supported on the partition section 44 in the axial direction 18.

The first clutch arrangement 28 is also assigned a first inner plate carrier 46 which is of substantially tubular design and which is rotationally fixedly connected to the inner plates of the first clutch arrangement 28, with the inner plates of the first clutch arrangement 28 being movable along the first inner plate carrier 46 in the axial direction 16, 18. The first inner plate carrier 46 is adjoined in an integral fashion in the axial direction 16 by a support section 48 which extends inward in the radial direction 22, with a first clutch output hub 50 being provided on that side of said support section 48 which points inward in the radial direction 22. The first clutch output hub 50 is rotationally fixedly but releasably connected to the first transmission input shaft 10, with the connection particularly being a positively locking connection, more particularly an axial plug-in connection.

The second clutch arrangement 30 is in turn assigned a substantially tubular second inner plate carrier 52. The second inner plate carrier 52 is rotationally fixedly connected to the inner plates of the second clutch arrangement 30, wherein in this case too the inner plates of the second clutch arrangement 30 are movable in the axial direction 16, 18 along the second inner plate carrier 52. The second inner plate carrier 52 is adjoined in an integral fashion in the axial direction 18 by a support section 54, with the support section 54 in turn extending inward in the radial direction 22, so as to hold a second clutch output hub 56 at its end situated at the inside in the radial direction 22. The second clutch output hub 56 is in turn rotationally fixedly connected to the second transmission input shaft 12, with the rotationally fixed connection again being obtained by positive locking and being of releasable design. Said connection is also particularly an axial plug-in connection in order to ensure simple assembly and disassembly.

As can be seen from FIG. 1, the first and second support regions 34, 42 are bulged or offset in the axial direction 18 and 16 respectively in their radially inner region in such a way that they are arranged in a radially nested fashion with the in each case adjacent clutch arrangement 28 and 30. The available installation space is optimally utilized in this way. It can also be seen from FIG. 1 that the parallel double clutch device 2 is of symmetrical design. The first clutch arrangement 28, the first outer plate carrying section 40 and the first inner plate carrier 46 are thus formed symmetrically with respect to the second clutch arrangement 30, the second outer plate carrying section 38 and the second inner plate carrier 52 about a plane spanned by the radial directions 20, 22.

Furthermore, the first support section 34 of the outer plate carrier 36 and the adjacent support section 54 of the second inner plate carrier 52 are separated from one another in the axial direction 16, 18 by a first needle-roller bearing 58. Furthermore, a second needle-roller bearing 60 is provided between the mutually adjacent support sections 54, 48 of the inner plate carriers 52, 46, which second needle-roller bearing 60 serves to separate the two support sections 54, 48 in the axial direction 16, 18. Also provided is a third needle-roller bearing 62 which separates the support section 48 of the first inner plate carrier 46 in the axial direction 18 from the flange of a support tube, wherein said support tube will be described in more detail further below. Here, the needle-roller bearings 58, 60, 62 are arranged in alignment with one another in the axial direction 16, 18.

The parallel double clutch device 2 is arranged in a wet space 64 within a stationary and rotationally fixed clutch housing 66. Here, the wet space 64 is delimited in the axial direction 18 by a first housing section 68 and in the opposite axial direction 16 by an opposite second housing section 70. The first housing section 68 is particularly the base of a housing or transmission housing bell with a housing opening pointing in the axial direction 16, while the second housing section 70 is particularly formed by a housing cover for closing off the housing opening. In the region of the rotational axis 14, the first housing section 68 has a shaft passage opening 72 through which the transmission input shafts 10, 12 of the transmission 6 extend in the axial direction 16 to the parallel double clutch device 2. Here, the shaft passage opening 72 has an encircling, radially inwardly pointing edge 74. Correspondingly, the second housing section 70 also has a shaft passage opening 76 in the region of the rotational axis 14, through which shaft passage opening 76 the output hub 8 of the drive unit 4 and/or the clutch input hub 32 of the parallel double clutch device 2 extends in order to provide a rotationally driving connection between the drive unit 4 and the parallel double clutch device 2. The shaft passage opening 76 is also surrounded by an encircling edge 78 on the second housing section 70, which edge 78 points inward in the radial direction 22.

The first clutch arrangement 28 is assigned a first actuator 80, while the second clutch arrangement 30 is assigned a second actuator 82, which actuators will be explained in more detail below. A first pressure chamber housing 84 is attached in a stationary and rotationally fixed manner to the first housing section 68, while a second pressure chamber housing 86 is attached in a stationary and rotationally fixed manner to the second housing section 70. In the present example, the pressure chamber housings 84, 86 have therefore initially been produced separately from the respective housing section 68, 70 before subsequently being fastened to the respective housing section 68, 70. Here, said pressure chamber housings 84, 86 are particularly releasably fastened to the respective housing section 68, 70. The pressure chamber housings 84, 86 could however basically also alternatively be formed in one piece with the respective housing section 68, 70, but the illustrated embodiment is particular with regard to production and with regard to repair or servicing which may be required. By the fastening of the pressure chambers housings 84, 86 to the associated housing section 68, 70, the pressure chamber housings 84, 86 are therefore formed, like the clutch housing 66, so as to be stationary and rotationally fixed.

Both pressure chamber housings 84, 86 are of annular design, such that these run around the rotational axis 14 in the circumferential direction 24, 26, with in each case one encircling depression being provided in the pressure chamber housings 84, 86. The first pressure chamber housing 84 thus has an encircling depression which is open in the axial direction 16 and into which a hydraulically drivable first actuating piston 88 is inserted so as to form a first pressure chamber 90, which is therefore delimited by the first pressure chamber housing 84 and the first actuating piston 88. The first pressure chamber 90 is therefore likewise of annular design, wherein furthermore, encircling seals 92 for sealing off the first pressure chamber 90 are provided between the first actuating piston 88 and the wall of the first pressure chamber 90. A second actuating piston 94 is in turn inserted into the encircling depression, which is open in the axial direction 18, within the second pressure chamber housing 86, in such a way that a second pressure chamber 96 is formed which is delimited by the second pressure chamber housing 86 and the second actuating piston 94. Encircling seals 98 are also provided on the hydraulically drivable second actuating piston 94 in order to reliably seal off the second pressure chamber 96.

Both actuating pistons 88, 94 are arranged so as to be movable in the axial direction 16, 18 within the associated pressure chamber housing 84 or 86, but the actuating pistons 88, 94 are in each case rotationally fixedly connected to the associated pressure chamber housing 84 and 86. The actuating pistons 88, 94 may therefore also be referred to as rotationally fixed actuating pistons which cannot be rotated about the rotational axis 14. The rotationally fixed connection of the actuating piston 88, 94 to the associated pressure chamber housing 84 or 86 is obtained here particularly by positive locking, with it being particular for a projecting extension to be provided at one side and for a depression to be provided on the other side, into which depression the projecting extension engages (not illustrated). Furthermore, the two actuating pistons 88, 94 have different actuating directions in which the actuating pistons 88, 94 are moved in order to actuate the respective clutch arrangement 28, 30. The actuating direction 100 of the first actuating piston 88 thus corresponds to the axial direction 16, while the actuating direction 102 of the second actuating piston 94 corresponds to the axial direction 18, such that the actuating pistons 88, 94 have mutually opposite actuating directions 100, 102.

To be able to supply the pressure chambers 90, 96 with pressurized oil or some other hydraulic medium, at least one pressurized oil duct 104 for supplying pressurized oil into the pressure chamber 90 is provided within the wall of the first housing section 68. The first pressure chamber housing 84 is in turn fastened to the first housing section 68 in such a way that the pressurized oil duct 104 opens into an opening 106 in the stationary and rotationally fixed first pressure chamber housing 84, such that the first pressure chamber 90 can be supplied with pressurized oil via the pressurized oil duct 104 and the opening 106. If the first pressure chamber housing 84 is formed so as to be only partially stationary and/or rotationally fixed, then said opening 106 should be provided in the stationary and/or rotationally fixed part of the first pressure chamber housing 84. Correspondingly, a pressurized oil duct 108 is also formed within the wall of the second housing section 70, which pressurized oil duct 108 opens into an opening 110 in the second pressure chamber housing 86, such that the second pressure chamber 96 can be acted on with pressurized oil via the pressurized oil duct 108 and the opening 110. In this case, too, the opening 110 should be provided at least in the stationary and/or rotationally fixed part of the second pressure chamber housing 86 if the second pressure chamber housing 86 is formed so as to be at least partially stationary and/or rotationally fixed.

The two clutch arrangements 28, 30 cannot be directly actuated by the associated actuating piston 88 or 94. A first force-transmitting element 112 and a second force-transmitting element 114 are in fact provided. Here, the two force-transmitting elements 112 and 114 are designed so as to bridge the spacing between the actuating pistons 88, 94 in the radial direction 20, 22 to the associated clutch arrangement 28 or 30, such that the actuating pistons 88, 94 and/or the associated engagement bearings, which will be described in more detail further below, can be arranged radially inside or outside the associated clutch arrangement 28 or 30, with the actuating pistons 88, 94 and the associated engagement bearings being arranged radially within the associated clutch arrangement 28 or 30 in the illustrated embodiment. The available installation space is utilized in an optimum manner in this way and an increase in the axial structural length of the parallel double clutch device 2 can be avoided. Here, the actuating pistons 88, 94 and/or the associated engagement bearings are particularly arranged in a nested fashion with the associated clutch arrangements 28 and 30 in the radial direction 20, 22, even though this is not shown in FIG. 1. The force-transmitting elements 112, 114 therefore extend substantially outward in the radial direction 20 proceeding from the actuating pistons 88, 94, before subsequently extending with end-side actuating fingers 116, which extend in the axial direction 16 or 18, to the associated clutch arrangement 28 or 30. Here, the actuating fingers 116 extend in the axial direction 16 or 18 through corresponding cutouts 118 in the second support section 42 or the first support section 34 of the outer plate carrier 36. In this way, a rotationally driving connection is also created between the first force-transmitting element 112 and the second support section 42 and between the second force-transmitting element 114 and the first support section 34.

To prevent a torque from being transmitted—be it even only on account of friction—from the force-transmitting element 112, 114 to the associated actuating piston 88 or 94, the actuating pistons 88, 94 and the associated force-transmitting element 112 or 114 are decoupled in terms of rotational drive by an engagement bearing 120 and 122 between the actuating piston 88, 94 and the force-transmitting element 112 and 114. On account of said decoupling in terms of rotational drive, it would fundamentally be possible to dispense with the rotationally fixed arrangement of the actuating pistons 88, 94 on the associated pressure chamber housing 84 or 86, but the rotationally fixed arrangement of the actuating piston 88, 94 on the associated pressure chamber housing 84, 86 is however particular, especially since a rotation of the actuating piston 88, 94 relative to the associated pressure chamber housing 84 or 86 can be prevented particularly effectively in this way, such that in the region of the encircling seals 92, 98, a particularly high degree of sealing of the respective pressure chamber 90, 96 can be obtained. As can be seen from FIG. 1, the engagement bearing 120, 122 is arranged here on the associated actuating piston 88 or 94 in such a way as to dip at least partially into the U-shaped cross section of the actuating piston 88 or 94 in the axial direction 18 or 16, as a result of which not only a particularly lightweight actuating piston 88, 94 but rather also a short axial structural length of the parallel double clutch device 2 can be obtained. It can also be seen from FIG. 1 that an annular-disk-shaped spacer 124 is provided in the axial direction 16, 18 between the actuating piston 88, 94 and the associated engagement bearing 120 and 122, via which spacer 124 the engagement bearing 120, 122 is supported in the axial direction 18 and in the axial direction 16 on the associated actuating pistons 88 and 94 respectively. Here, the one or more spacers 124 is/are arranged in an exchangeable fashion on the respective actuating piston 88 or 94 such that tolerance compensation can be obtained by the selection of corresponding thick or thin spacers 124.

On account of the stationary pressure chamber housing 84, 86 and the rotationally fixed actuating piston 88, 94, which moreover are decoupled in terms of rotational drive from the associated force-transmitting element 112 or 114, the pressure chambers 90, 96 can be acted on with pressurized oil at particularly high pressure without increased leakage losses occurring, especially since the parallel double clutch device 2 according to the invention dispenses with a rotary leadthrough, the rotary leadthrough seals of which are only suitable to a limited extent for withstanding a high pressure of the pressurized oil. For this reason, in the illustrated parallel double clutch device 2, at least one high-pressure accumulator is also integrated into the pressurized oil supply paths, with said high-pressure accumulators not being illustrated in FIG. 1. Furthermore, the stationary and rotationally fixed pressure chamber housings 84, 86 and the rotationally fixed actuating pistons 88, 94 which are decoupled in terms of rotational drive have the effect that no centrifugal oil pressure is generated in the pressure chambers 90, 96, such that the parallel double clutch device 2 dispenses entirely with corresponding compensating chambers for centrifugal oil compensation, which would entail a more complex design of the parallel double clutch device 2.

On account of the relatively high pressure within the pressurized oil supply paths, it is also possible to dispense with a lever-like design of the force-transmitting elements 112, 114, which would basically also be possible here. The force-transmitting elements 112, 114 are thus designed so as to transmit the forces of the actuating pistons 88 and 94, which forces act in the actuating direction 100 and 102, to the associated clutch arrangement 28 and 30 without a lever ratio in the ratio 1:1. Since lever-like force-transmitting elements are dispensed with, it is also possible to obtain a reduction in the axial structural length of the parallel double clutch device 2. Also, to simplify the design, the force-transmitting elements 112, 114 are of single-piece design in the illustrated embodiment. To further simplify the design, the force-transmitting elements 112, 114 interact directly with the associated engagement bearing 120 and 122 and the associated clutch arrangement 28 and 30.

In the illustrated embodiment, the restoring of the two actuating pistons 88, 94 into their starting position shown in FIG. 1 does not take place by an elastic force-transmitting element 112 or 114; in fact, the force-transmitting element 112 or 114, which is of rigid and substantially non-elastic design, is assigned in each case at least one restoring spring 126, wherein the restoring spring 126 should be at least more elastic than the relatively rigid force-transmitting element 112 or 114. At least one restoring spring 126 thus extends in the axial direction 16, 18 between the first force-transmitting element 112 and the second support section 42 of the outer plate carrier 36, while at least one other restoring spring 126 extends in the axial direction 16, 18 between the second force-transmitting element 114 and the first support section 34 of the outer plate carrier 36. The restoring springs 126 are also arranged radially within the associated clutch arrangement 28 or 30, with the restoring springs 126 being arranged at least partially in a nested fashion with the associated clutch arrangement 28 or 30 in the radial direction 20, 22.

To provide support of the parallel double clutch device 2 on the clutch housing 66, at least one stationary and rotationally fixed support tube 128 is also provided, which support tube 128 is fastened and supported indirectly on the first housing section 68 of the clutch housing 66. Here, the support tube 128 is composed of a tubular section 130, which extends in the axial direction 16, 18 and through which the transmission input shafts 10, 12 run, and a flange section 132 which adjoins the tubular section 130 in the axial direction 160 and which extends outward substantially in the radial direction 20 and has fasteners 134 for the releasable fastening of an insertion tool (not illustrated). The fasteners 134 may for example be fastening cutouts and/or projections. Here, the fasteners are arranged in alignment in the axial direction 16, 18 with cutouts 136 in the support sections 48, 54, 34 and if appropriate the second force-transmitting element 114, with it being possible for an insertion tool to be moved to the fasteners 134 on the flange section 132 in the axial direction 18 through said cutouts 136. The needle-roller bearing 62 already mentioned above is arranged in the axial direction 16, 18 between the support section 48 of the first inner plate carrier 46 and the flange section 132, which needle-roller bearing 62 separates the flange section 132 from the support section 48 in the axial direction 16, 18.

On its side facing away from the flange section 132, the tubular section 130 is releasably attached to the first pressure chamber housing 84. For this purpose, the tubular section 130 has an external thread which is screwed into an internal thread on the first pressure chamber housing 84. The support tube 128 could basically also be directly connected to the first housing section 68 of the clutch housing 66, but it is particular for the support tube 128 to be fastened indirectly to the first housing section 68 of the clutch housing 66 via the first pressure chamber housing 84, especially since inter alia a significantly simpler design and a lower weight of the parallel double clutch device 2 can be obtained in this way. The support tube 128 could alternatively also be formed by a section of the first pressure chamber housing 84 and therefore formed in one piece with the first pressure chamber housing 84, but on account of the additional flange section 132 and in order to obtain a modular design as will be described in more detail further below, the illustrated embodiment is particular.

The input side of the parallel double clutch device 2 is composed substantially of the input hub 32, the first support section 34, the outer plate carrier 36 and the second support section 42. To now support said input side in the axial direction 16, 18 and/or radial direction 20, 22 on the clutch housing 66, a rolling bearing 138 is provided in the radial direction 20, 22 between the radially inwardly pointing end of the second support section 42 and the radially outwardly pointing side of the tubular section 130 of the support tube 128, which rolling bearing 138 is designed in the present example as a ball bearing. Here, the rolling bearing 138 is fixed in such a way that the abovementioned input side of the parallel double clutch device 2 is or can be supported in both radial direction 20, 22 on the first housing section 68 of the clutch housing 66 via the support tube 128 and the first pressure chamber housing 84. Furthermore, the rolling bearing 138 is fixed and arranged in such a way that the actuating force, which acts in the actuating direction 100, of the first actuating piston 88 can be supported on the first housing section 68 of the clutch housing 66 via the rolling bearing 138, the support tube 128 and the first pressure chamber housing 84. The actuating force, which acts in the actuating direction 102, of the second actuating piston 94 can in contrast be supported on the first housing section 68 of the clutch housing 66 via the needle-roller bearing 58, 60, 62, the flange section 132, the tubular section 130 and the first pressure chamber housing 84. In this connection, it is however noted that it is particular if the actuating force, which acts in the actuating direction 102, of the second actuating piston 94 can also be supported on the first housing section 68 of the clutch housing 66 particularly predominantly, more particularly exclusively, via the rolling bearing 138, the support tube 128 and the first pressure chamber housing 84, as is the case in the third embodiment according to FIG. 3 which will be described further below. For this purpose, the rolling bearing 138 would be fixed both to the input side of the parallel double clutch device 2 and also to the support tube 128 in both axial directions 16, 18, or in both actuating directions 100, 102. Here, to generate support predominantly or even entirely via the rolling bearing 138, the needle-roller bearings 58, 60, 62 should have a corresponding degree of axial play.

The first clutch arrangement 28 is assigned a first cooling oil supply path 140 via which the cooling oil passes into the wet space 64 within the clutch housing 66 and to the first clutch arrangement 28. The first cooling oil path 140 runs initially through the shaft passage opening 72 within the first housing section 68, specifically between the outer first transmission input shaft 10 and the edge 74 of the shaft passage opening 72. The first cooling oil supply path 140 subsequently runs further between the outer first transmission input shaft 10 and the tubular section 130 of the support tube 128 in the axial direction 16 before subsequently passing outward in the radial direction 20 to the first clutch arrangement 28 via at least one passage opening (no reference numeral) in the tubular section 130. Consequently, the supply of cooling oil to the first clutch arrangement 28 takes place from the transmission 6 or the transmission side.

The second clutch arrangement 30 is in contrast assigned a second cooling oil supply path 142 which is at least initially separate from the first cooling oil supply path 140. The second cooling oil supply path 142 thus runs in the axial direction 18 through the shaft passage opening 76 in the second housing section 70 of the clutch housing 66, specifically between the edge 78 of the shaft passage opening 76 and the outer side of an input shaft of the double clutch device 2, with the input shaft being formed in the illustrated embodiment by the output hub 8 of the drive unit 4. The second cooling oil supply path 142 subsequently runs outward in the radial direction 20 so as to pass to the second clutch arrangement 30. The cooling oil for the second clutch arrangement 30 is consequently supplied from the drive unit 4 or the drive side.

Even though reference has been made throughout the above text to pressure chamber housings 84, 86, said pressure chamber housings 84, 86 may also be referred to as cylinders of the respective actuator 80 or 82. It is also clarified that the stationary and rotationally fixed pressure chamber housings 84, 86 are arranged on the slave side of the respective actuator 80, 82, such that the pressure chamber housings 84, 86 may also be referred to as slave cylinders.

A second embodiment of the parallel double clutch device 2 according to the invention will be described below with reference to FIG. 2, which second embodiment corresponds substantially to the above-described first embodiment, such that only the differences in relation to the first embodiment will be discussed below, the same reference numerals are used for identical or similar parts, and the above description otherwise applies correspondingly.

In the second embodiment according to FIG. 2, in contrast to the first embodiment, the supply of cooling oil to the second clutch arrangement 30 likewise takes place from the transmission 6 or the transmission side. The second cooling oil supply path 142 thus runs, proceeding from the transmission 6, in the axial direction 16 firstly through the inner second transmission input shaft 12 which, for this purpose, is designed as a hollow shaft similarly to the first transmission input shaft 10. Via the opening, which points in the axial direction 16, at the end of the second transmission input shaft 12, the second cooling oil supply path 142 runs onward into the interior space of the substantially pot-shaped clutch input hub 32 before subsequently running outward in the radial direction 20 via at least one radial opening 144, where the cooling oil passes to the second clutch arrangement 30.

A third embodiment of the parallel double clutch device 2 according to the invention will be described below with reference to FIG. 3, which third embodiment corresponds substantially to the above-described first embodiment, such that only the differences will be discussed below, the same reference numerals are used for identical or similar parts, and the above description otherwise applies correspondingly.

As already indicated above with reference to FIG. 1, in the third embodiment according to FIG. 3, the rolling bearing 138 is fixed both to the second support section 42 of the input side of the parallel double clutch device 2 and also to the support tube 128 in both axial directions 16, 18 or in both actuating directions 100, 102. In this way, both the actuating force of the first actuating piston 88, which acts in the actuating direction 100, and also the actuating force of the second actuating piston 94, which acts in the actuating direction 102, is supported on the first housing section 68 of the clutch housing 66 indirectly via the input side of the parallel double clutch device 2, the rolling bearing 138, the support tube 128 and the first pressure chamber housing 84. In this way, the needle-roller bearings 58, 60, 62 are relieved of load and loss-free operation, which cannot be achieved to the same extent by support via the needle-roller bearings 58, 60, 62, is possible. For this reason, the needle-roller bearings 58, 60, 62 particularly have play in the axial direction 16, 18, such that the actuating force, which acts in the actuating direction 102, of the second actuating piston 94 can be supported on the clutch housing 66 predominantly, particularly exclusively, via the rolling bearing 138, the support tube 128 and the first pressure chamber housing 84. Although the first embodiment according to FIG. 3 shows the same cooling oil supply for the two clutch arrangements 28, 30 as has already been realized in the first embodiment according to FIG. 1, it is noted that, in the third embodiment too, the cooling oil supply can take place along the cooling oil supply paths 140 and 142 as has been described with reference to FIG. 2.

A fourth embodiment of the parallel double clutch device 2 according to the invention will be described below with reference to FIG. 4, which fourth embodiment corresponds substantially to the embodiments described above with reference to FIGS. 1 to 3, such that only the differences will be discussed below, the same reference numerals are used for identical or similar parts, and the above description otherwise applies correspondingly.

In the fourth embodiment, the support tube 128 is dispensed with. The second support section 42 of the input side is in fact supported in the radial direction 20, 22 on the outwardly pointing side of the first clutch output hub 50 via a tubular hub 146 and an interposed bearing 148. To support the input side of the parallel double clutch device 2 in the radial direction 20, 22 on the stationary clutch housing 66, a rolling bearing 150 is also provided in the shaft passage opening 76, which rolling bearing 150 is supported at one side in the radial direction 20 on the edge 78 of the shaft passage opening 76 and at the other side in the radial direction 22 on the outside of the clutch input hub 32. Furthermore, the rolling bearing 150 is fixed both to the second housing section 70 of the clutch housing 66 and also to the clutch input hub 32 in both axial directions 16, 18 or in both actuating directions 100, 102, such that both the actuating force of the first actuating piston 88, which acts in the actuating direction 100, and also the actuating force of the second actuating piston 94, which acts in the actuating direction 102, can be or is supported on the second housing section 70 of the clutch housing 66 indirectly via the input side of the parallel double clutch device 2 and the rolling bearing 150.

Since the rolling bearing 150 within the shaft passage opening 76 constitutes an obstruction for the cooling oil of the second clutch arrangement 30, a cooling oil duct 152 is also formed within the wall of the second housing section 70 of the clutch housing 66, through which cooling oil duct 152 the second cooling oil supply path 142 runs into the wet space 64, from where the second cooling oil supply path 142 subsequently passes radially outward to the second clutch arrangement 30. It would however also alternatively be possible to select a second cooling oil supply path 142 in the sense of the second embodiment according to FIG. 2. As can be seen from FIG. 4, the cooling oil duct 152 is therefore not formed by the shaft passage opening 76, such that the rolling bearing 150 does not constitute an obstruction for the cooling oil inflow. It is also noted that a cooling oil duct could be formed within the first housing section 68 of the clutch housing 66 for the first cooling oil supply path 140 too, which cooling oil duct does not correspond to the shaft passage opening 72 in the first housing section 68, in order if appropriate to obtain a more direct supply of cooling oil both to the second clutch arrangement 30 and also to the first clutch arrangement 28. It is also mentioned that the cooling oil supply paths 140, 142 in the above-described embodiments according to FIGS. 1 to 3 may also run through corresponding cooling oil ducts within the wall of the first and/or second housing section 68, 70 of the clutch housing 66 in order to ensure a more direct supply of cooling oil if appropriate.

In the fourth embodiment according to FIG. 4, a particularly transmission-side oil pump is also provided, which oil pump may serve for example for feeding the cooling oil and is indicated only partially in FIG. 4. FIG. 4 shows only the pump drive member 154 of the oil pump, with the pump drive member 154 being designed as a traction mechanism gear wheel or as a chain gear wheel. The pump drive is consequently a traction mechanism drive or a chain gear. For the purpose of driving the oil pump, the input side of the parallel double clutch device 2 is in rotationally driving connection with the pump drive member 154 which is rotatable about the rotational axis 14. This is achieved in that the tubular hub 146 on the second support section 42 is elongated in the axial direction 18 in order there to produce a positively locking rotationally driving connection with the pump drive member 154. Here, the hub 146 is releasably connected to the pump drive member 154, with said releasable connection being generated particularly by a plug-in connection which is generated by joining the tubular hub 146 together with the pump drive member 154 in the axial direction 18.

A further particular advantage of the fourth embodiment is that the pressure chamber housings 84, 86 are of structurally identical design. This is possible since the support tube is dispensed with, which support tube would be fastened to the first pressure chamber housing 84 in order to obtain a compact design. Furthermore, the actuating pistons 88 and 94, the engagement bearings 120 and 122 and also the force-transmitting elements 112 and 114 are of structurally identical or identical design, thereby significantly simplifying the production of the parallel double clutch device 2. Said components may also be referred to as having a symmetrical design. Even though not shown in FIG. 4, the actuating pistons 88, 94 should particularly have the U-shaped cross section described with reference to the preceding Figures, into which U-shaped cross section the engagement bearings 120 and 122 dip in the axial direction 18 and 16 respectively in order to obtain a shorter axial structural length. A corresponding situation also applies to the above-described spacer 124 between the actuating piston 88 and 94 on the one hand and the engagement bearing 120 and 122 on the other hand, which spacer 124 serves for tolerance compensation and is not illustrated in FIG. 4 for clarity.

All the embodiments of the parallel double clutch device 2 described above with reference to FIGS. 1 to 4 have in common that they are assembled in modular fashion from substantially three modules. A first module has the first housing section 68, the first pressure chamber housing 84 fastened thereto, the first actuating piston 88, the engagement bearing 120 and, at least in the case of the fourth embodiment, the pump drive member 154. The second module has the two clutch arrangements 28, 30, the outer plate carrier 36, the inner plate carriers 46, 52, the restoring springs 126, the needle-roller bearings 58, 60, 62, the force-transmitting elements 112, 114 and, at least in the case of the embodiments according to FIGS. 1 to 3, the support tube 128 and the rolling bearing 138. Alternatively, the force-transmitting elements 112, 114 could however also be assigned, together with the associated restoring spring 126 and/or the associated engagement bearing 120 or 122, to the first module or to the third module which will be described below. In contrast, the third module has the second housing section 70 of the clutch housing 66, the second pressure chamber housing 86 which is fastened to the second housing section 70, the second actuating piston 94 and the engagement bearing 122. The three modules, in each case as a unit, can be assembled in the stated sequence and/or detached from one another in the reverse sequence, as will be explained below with reference to FIG. 1.

During the assembly of the modular parallel double clutch device 2, firstly the second module is joined together with the first module in the axial direction 18. For this purpose, an insertion tool (not illustrated) is guided in the axial direction 18 through the cutouts 136 until the insertion tool engages into the fasteners 134 on the flange section 132 of the support tube 128. Fastened in this way to the support tube 128, the insertion tool can be used to rotate the support tube 128 in the circumferential direction 24 or 26 about the rotational axis 14 such that the external thread on the tubular section 130 of the support tube 128 is screwed into the internal thread on the first pressure chamber housing 84. Once the second module has been assembled with the first module in this way, the third module, that is to say the second housing section 70 together with that part of the second actuator 82 which is arranged thereon, is joined together with the second module in the axial direction 18. The assembly is completed by fastening the second housing section 70 to the first housing section 68.

With regard to the fourth embodiment according to FIG. 4, it is also pointed out that, on account of the lack of a support tube 128, no cutouts 136 and also no insertion tool which would have to be guided through said cutouts are required. In fact, in the fourth embodiment, the connection between the first and second modules is obtained primarily by virtue of the second module being pushed onto the first module in the axial direction 18, wherein the second and third modules should have previously been connected to one another or pre-fixed to one another, which particularly takes place by the rolling bearing 150. During disassembly, too, the second and third modules should be detached in combination from the first module.

Furthermore, in all cases, the pushing of the second module onto the first module has the effect that the clutch output hubs 50, 56 are pushed onto the associated transmission input shaft 10 or 12 so as to generate a rotationally driving connection.

The present invention has been described above in an illustrative manner. It is to be understood that the terminology that has been used above is intended to be in the nature of words of description rather than of limitation. Many modifications and variations of the present invention are possible in light of the above teachings. Therefore, within the scope of the appended claims, the present invention may be practiced other than as specifically described above.

What is claimed is:

1. A parallel double-clutch device (2) for arranging in a drivetrain of a motor vehicle between a drive unit (4) and transmission (6) of the drivetrain, said parallel double-clutch device (2) comprising:
a first clutch arrangement (28) assigned to a first transmission-input shaft (10) for selectively transmitting torque between the drive unit (4) and first transmission-input shaft (10); and
a second clutch arrangement (30) assigned to a second transmission-input shaft (12) for selectively transmitting torque between the drive unit (4) and second transmission-input shaft (12), wherein the first clutch arrangement (28) can be actuated by at least one hydraulically drivable first actuating piston (88) that is assigned a first pressure chamber (90) delimited by a first pressure-chamber housing (84) and the first actuating piston (88), the second clutch arrangement (30) can be actuated by at least one hydraulically drivable second actuating piston (94) that is assigned a second pressure chamber (96) delimited by a second pressure-chamber housing (86) and the second actuating piston (94), and the first and second pressure-chamber housing (84; 86) are rotationally fixed, and wherein first and second openings (106; 110) supply pressurized oil into the first and second pressure chambers (90; 96) of the first and second pressure-chamber housings (84; 86) with the said first and second openings (106; 110) being provided in said first and second pressure-chamber housings (84; 86);
said first and second clutch arrangement (28; 30) actuated by said first and second actuating pistons (88; 94) indirectly via force-transmitting elements (112; 114) with said first and second actuating pistons (88; 94) and force-transmitting elements (112; 114) being rotationally decoupled by engagement bearings (120; 122) between said first and second actuating piston (88; 94) and said first and second force-transmitting elements (112; 114) and said first and second actuating pistons (88; 94) being rotationally fixedly connected to said first and second pressure-chamber housings (84; 86);
said double clutch device (2) arranged in a rotationally fixed clutch housing (66) with said first and second pressure-chamber housings (84; 86) being attached to the said clutch housing (66) in a rotationally fixed manner; and
wherein said clutch housing (66) has a first housing section (68) and a second housing section (70) that is situated opposite in an axial direction (16) with said first pressure chamber housing (84) being provided on the first housing section (68) and said second pressure chamber housing (86) being provided on the second housing section (70).

2. The double-clutch device (2) as set forth in claim 1, wherein the actuating force of said first and second actuating pistons (88; 94) can be transmitted in a ratio of 1:1 to said first and second clutch arrangements (28; 30) with the force-transmitting element (112; 114) being formed in at least one of one piece and interacting directly with at least one of said engagement bearings (120; 122) and said first and second clutch arrangements (28; 30).

3. The double-clutch device (2) as set forth in claim 1, wherein the first and second clutch arrangements (28, 30) are assigned at least initially mutually separate cooling-oil-supply paths (140, 142) with at least one of the cooling-oil-supply path (140) running through a shaft-passage opening (72) in the first housing section (68) between an edge (74) of the shaft-passage opening (72) and one of the transmission-input shafts (10, 12) and the cooling-oil-supply path (142) running through at least one of a shaft-passage opening (76) in the second housing section (70) between an edge (78) of the shaft-passage opening (76) and an input shaft (8, 32) of the double-clutch device (2) and within one of the transmission-input shafts (10, 12).

4. The double-clutch device (2) as set forth in claim 3, wherein at least one of the cooling-oil-supply paths (140, 142) runs through a cooling-oil duct (152) that is situated within a wall of the clutch housing (66) and not formed by the shaft-passage opening (72, 76) in the clutch housing (66) with the cooling-oil-supply path (140) running through the cooling-oil duct (152) within the first housing section (68) and another cooling-oil-supply path (142) running through the cooling-oil duct (152) within the second housing section (70).

5. The double-clutch device (2) as set forth in claim 1, wherein at least one of the actuating pistons (88; 94) and associated engagement bearing (120; 124) is arranged radially of at least one of inside and outside the associated clutch arrangement (28; 30) with a restoring spring (126) restoring the actuating piston (88; 94) and arranged radially either of inside and outside the associated clutch arrangement (28; 30).

6. The double-clutch device (2) as set forth in claim 5, wherein at least one of said first and second actuating pistons (88; 94) and associated engagement bearings (120; 124) is arranged radially either of said first and second clutch arrangement (28; 30) in a radially nested configuration and the restoring spring (126) is arranged radially of either said inside and outside the associated clutch arrangement (28; 30) in a radially nested configuration.

7. The double-clutch device (2) as set forth in claim 1, wherein the double-clutch device (2) is supported in at least one of radial directions (20, 22), the axial direction (16), and an axial direction (18) on the clutch housing (66) via a rolling bearing (138).

8. The double-clutch device (2) as set forth in claim 7, wherein said first and second actuating pistons (88, 94) have mutually opposite actuating directions (100, 102) with it being possible for the actuating forces in both of the actuating directions (100, 102) to be supported on the clutch housing (66) via the rolling bearing (138).

9. The double-clutch device (2) as set forth in claim 7, wherein an input side of the double-clutch device (2) is supported in at least one of the axial and radial directions (16, 18; 20, 22) on a stationary support tube (128) on the clutch housing (66).

10. The double-clutch device (2) as set forth in claim 1, wherein a support tube (128) is attached to at least one of the pressure-chamber housings (84) and formed by a section of the pressure-chamber housing (84) and releasably attached to one of the clutch housing (66) and pressure-chamber housing (84) either of an external and internal thread on the support tube (128).

11. The double-clutch device (2) as set forth in claim 10, wherein the double-clutch device (2) is in rotationally driving connection with a pump-drive member (154) of a transmission-side oil pump, the pump-drive member (154) is a traction-mechanism gear wheel, and the double-clutch device (2) is releasably connected to the pump-drive member (154) by a plug-in connection.

12. The double-clutch device (2) as set forth in claim 11, wherein the double-clutch device (2) is composed of three modules in sequence and of which a first module has the first housing section (68), associated pressure-chamber housing (84), associated actuating piston (88), associated engagement bearing (120), and pump-drive member (154), a second module has the two clutch arrangements (28, 30) and at least one of the support tube (128) and force-transmitting elements (112, 114), and a third module has the second housing section (70), associated pressure-chamber housing (86), associated actuating piston (94), and associated engagement bearing (122) with it being possible for the three modules, in each case as a unit, to be assembled at least one of in the sequence and detached from one another in a reverse sequence.

13. A drivetrain of a motor vehicle comprising:
a drive unit (4);
a transmission (6); and
a parallel double-clutch device (2) arranged between the drive unit (4) and transmission (6) with an outer transmission-input shaft (10) and inner transmission-input shaft (12) being arranged in a radially nested fashion, the parallel double-clutch device (2) including:
first clutch arrangement (28) assigned to the outer transmission-input shaft (10) for selectively transmitting torque between the drive unit (4) and outer transmission-input shaft (10); and
a second clutch arrangement (30) assigned to the inner transmission-input shaft (12) for selectively transmitting torque between the drive unit (4) and inner transmission-input shaft (12), wherein the first clutch arrangement (28) can be actuated by at least one hydraulically drivable first actuating piston (88) that is assigned a first pressure chamber (90) delimited by a first pressure-chamber housing (84) and the first actuating piston (88), the second clutch arrangement (30) can be actuated by at least one hydraulically drivable second actuating piston (94) that is assigned a second pressure chamber (96) delimited by a second pressure-chamber housing (86) and the second actuating piston (94), and said first and second pressure-chamber housings (84; 86) are rotationally fixed, and wherein at least one of the first and second clutch arrangements (28; 30) is a wet-running multi-plate clutch arrangement;
said first and second clutch arrangements (28; 30) can be actuated by said first and second actuating pistons (88; 94) indirectly via force-transmitting elements (112; 114) with said first and second actuating pistons (88; 94) and force-transmitting elements (112; 114) being rotationally decoupled by an engagement bearing (120; 122) between said first and second actuating pistons (88; 94) and said first and second force-transmitting elements (112; 114) and said first and second actuating pistons (88; 94) being rotationally fixedly connected to said first and second pressure-chamber housing (84; 86);
said double clutch device (2) arranged in a rotationally fixed clutch housing (66) with said first and second pressure-chamber housings (84; 86) being formed in one piece with the clutch housing (66) in a rotationally fixed manner; and
wherein said clutch housing (66) has a first housing section (68) and a second housing section (70) that is situated opposite in an axial direction (16) with said first pressure chamber housing (84) being provided on the first housing section (68) and said second pressure chamber housing (86) being provided on the second housing section (70).

14. The double-clutch device (2) as set forth in claim 1, wherein at least one pressurized oil duct (104; 108) supplies pressurized oil into at least one of the pressure chambers (90; 96) running within a wall of the clutch housing (66).

15. The double-clutch device (2) as set forth in claim 1, wherein the first housing section (68) is either of a housing and transmission-housing bell with a housing opening and the second housing section (70) is a housing cover for closing off the housing opening.

* * * * *

UNITED STATES PATENT AND TRADEMARK OFFICE
CERTIFICATE OF CORRECTION

PATENT NO. : 9,062,723 B2  
APPLICATION NO. : 13/389116  
DATED : June 23, 2015  
INVENTOR(S) : Hans Juergen Hauck et al.

It is certified that error appears in the above-identified patent and that said Letters Patent is hereby corrected as shown below:

In the claims

Column 22, line 7 delete "with the said" and insert therefor --with said--.

Signed and Sealed this
Tenth Day of May, 2016

Michelle K. Lee
*Director of the United States Patent and Trademark Office*